(12) United States Patent
McDonald et al.

(10) Patent No.: US 10,310,862 B2
(45) Date of Patent: Jun. 4, 2019

(54) DATA PROCESSING

(71) Applicant: ARM Limited, Cambridge (GB)

(72) Inventors: Robert Greg McDonald, Austin, TX (US); Michael Filippo, Driftwood, TX (US); Glen Andrew Harris, Austin, TX (US)

(73) Assignee: ARM Limited, Cambridge (GB)

( * ) Notice: Subject to any disclaimer, the term of this patent is extended or adjusted under 35 U.S.C. 154(b) by 84 days.

(21) Appl. No.: 15/464,727

(22) Filed: Mar. 21, 2017

(65) Prior Publication Data

US 2018/0275994 A1   Sep. 27, 2018

(51) Int. Cl.

| G06F 9/302 | (2018.01) |
| G06F 9/312 | (2018.01) |
| G06F 9/52  | (2006.01) |
| G06F 9/38  | (2018.01) |
| G06F 9/30  | (2018.01) |
| G06F 9/32  | (2018.01) |

(52) U.S. Cl.
CPC .......... *G06F 9/3855* (2013.01); *G06F 9/3001* (2013.01); *G06F 9/3016* (2013.01); *G06F 9/30025* (2013.01); *G06F 9/30043* (2013.01); *G06F 9/30094* (2013.01); *G06F 9/324* (2013.01); *G06F 9/3838* (2013.01); *G06F 9/3857* (2013.01); *G06F 9/3859* (2013.01)

(58) Field of Classification Search
CPC .... G06F 9/3855; G06F 9/3001; G06F 9/3016; G06F 9/3857; G06F 9/3859; G06F 9/30025; G06F 9/30043; G06F 9/30087; G06F 9/30094; G06F 9/324; G06F 9/34; G06F 9/3812; G06F 9/3824; G06F 9/383; G06F 9/3834; G06F 9/3838; G06F 9/384
USPC ................ 712/222, 244, 214–219
See application file for complete search history.

(56) References Cited

U.S. PATENT DOCUMENTS

| 8,301,870 B2 * | 10/2012 | Kailas ...................... G06F 9/445 712/227 |
| 2002/0152259 A1 * | 10/2002 | Trong ................... G06F 9/3017 709/201 |
| 2009/0150653 A1 * | 6/2009 | Monferrer ............... G06F 9/321 712/217 |
| 2013/0151819 A1 * | 6/2013 | Piry ......................... G06F 9/38 712/217 |

* cited by examiner

*Primary Examiner* — Daniel H Pan
(74) *Attorney, Agent, or Firm* — Nixon & Vanderhye P.C.

(57) ABSTRACT

Data processing circuitry comprises out-of-order instruction execution circuitry to execute program instructions in an instruction execution order; a data store, to store information on a set of instructions for which execution has been initiated, the data store providing ordering information indicating the relative position of each instruction in the set of instructions with respect to a program code order; commit circuitry to commit the results of instructions executed by the instruction execution circuitry; one or more cumulative status registers configured to be set in response to a respective condition generated by execution of an instruction and then to remain set until an unset instruction is executed; and an identifier store, to store for at least those of the one or more cumulative status registers which are not currently set, an identifier of an instruction which is earliest in the program code order in the set of instructions and which generated a condition to set that cumulative status register.

10 Claims, 5 Drawing Sheets

DATA PROCESSING

BACKGROUND

This disclosure relates to data processing.

Data processing arrangements can make use of pipelined decoding and execution of instructions. The decoding process involves, as part of its functionality, allocating processor resources to the decoded instructions. The processor resources may be, for example, processor registers or register mappings and/or entries in buffers or the like such as re-order buffers, renaming lists or reservation stations.

Some arrangements make use of so-called cumulative status registers, for example relating to floating point operations.

Here, the term "cumulative" indicates that once a register has been "set", it remains "set" until an explicit operation takes place to "unset" it. Therefore, if one of the registers is in a set condition, this indicates that the respective condition has occurred at some point since the last time the register was unset. In examples, a "set" register can be represented by a value 1 at the relevant bit position or data field, and an "unset" register can be represented by the value 0 at the relevant bit position or data field. However, other representations and/or pluralities can be used.

In the case of out of order execution, measures are used to provide for the setting of such cumulative status registers in response to instruction execution.

SUMMARY

In an example arrangement there is provided data processing circuitry comprising:

out-of-order instruction execution circuitry to execute program instructions in an instruction execution order;

a data store, to store information on a set of instructions for which execution has been initiated, the data store providing ordering information indicating the relative position of each instruction in the set of instructions with respect to a program code order;

commit circuitry to commit the results of instructions executed by the instruction execution circuitry;

one or more cumulative status registers configured to be set in response to a respective condition generated by execution of an instruction and then to remain set until an unset instruction is executed; and an identifier store, to store for at least those of the one or more cumulative status registers which are not currently set, an identifier of an instruction which is earliest in the program code order in the set of instructions and which generated a condition to set that cumulative status register.

In another example arrangement there is provided a data processing method comprising:

executing program instructions in an instruction execution order;

storing information on a set of instructions for which execution has been initiated, including providing ordering information indicating the relative position of each instruction in the set of instructions with respect to a program code order;

committing the results of executed instructions;

setting one or more cumulative status registers in response to a respective condition generated by execution of an instruction, a cumulative status register which has been set then remaining set until an unset instruction is executed; and storing for at least those of the one or more cumulative status registers which are not currently set, an identifier of an instruction which is earliest in the program code order in the set of instructions and which generated a condition to set that cumulative status register.

In another example arrangement there is provided data processing circuitry comprising:

means for executing program instructions in an instruction execution order;

means for storing information on a set of instructions for which execution has been initiated, including providing ordering information indicating the relative position of each instruction in the set of instructions with respect to a program code order;

means for committing the results of executed instructions;

means for setting one or more cumulative status registers in response to a respective condition generated by execution of an instruction, a cumulative status register which has been set then remaining set until an unset instruction is executed; and means for storing for at least those of the one or more cumulative status registers which are not currently set, an identifier of an instruction which is earliest in the program code order in the set of instructions and which generated a condition to set that cumulative status register.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides data processing circuitry comprising:

out-of-order instruction execution circuitry to execute program instructions in an instruction execution order;

a data store, to store information on a set of instructions for which execution has been initiated, the data store providing ordering information indicating the relative position of each instruction in the set of instructions with respect to a program code order;

commit circuitry to commit the results of instructions executed by the instruction execution circuitry;

one or more cumulative status registers configured to be set in response to a respective condition generated by execution of an instruction and then to remain set until an unset instruction is executed; and an identifier store, to store for at least those of the one or more cumulative status registers which are not currently set, an identifier of an instruction which is earliest in the program code order in the set of instructions and which generated a condition to set that cumulative status register.

In contrast to previously proposed arrangements for handling the setting of cumulative status registers in out of order execution, in which each currently pending or "in flight" instruction has associated data indicating its effect on each of the cumulative status registers, a potential saving of storage and a potential increase in efficiency can be achieved by instead providing an identifier store, to store for at least those of the one or more cumulative status registers which are not currently set, an identifier of an instruction which is earliest in the program code order in the set of instructions and which generated a condition to set that cumulative status register. So, instead of storing an indication of each cumulative status register for each in-flight instruction, the identifier store can instead store an indication of one in-flight instruction for each cumulative status register.

Although some examples might not store data in the identifier store in respect of already-set cumulative status registers, in example arrangements the identifier store is configured to store, for each of the one or more cumulative status registers, the identifier of the instruction, earliest in the program code order in the set of instructions, which generated a condition to set that cumulative status register.

Example arrangements provide control circuitry to set a currently unset cumulative status register in response to an instruction identified in the identifier store being committed. For example, the control circuitry may be configured to remove an identifier from an entry in the identifier store associated with a cumulative status register, in response to the control circuitry setting that cumulative status register.

A convenient way of accessing or indexing the identifier store can make use of an arrangement in which the data store is configured to access the information about the set of instructions according to the respective identifiers of those instructions.

In preparing to write a value to the identifier store, the control circuitry may be configured to detect, in response to execution of an instruction generating a condition to set a cumulative status register, whether the identifier of another instruction earlier in the program code order is present in the identifier store for that cumulative status register. For example, when the control circuitry determines that no other instruction earlier in the program code order is present in the identifier store for that cumulative status register, the control circuitry is configured to store the identifier of the current instruction in the identifier store.

In some examples, the control circuitry is configured to remove an identifier from an entry in the identifier store associated with a cumulative status register, in response to the flushing of the corresponding instruction.

In some examples, the cumulative status registers are arithmetic status registers which respectively indicate one or more conditions selected from the list consisting of:
  (i) an arithmetic saturation has occurred;
  (ii) an input denormal exception has occurred;
  (iii) an inexact exception has occurred;
  (iv) an arithmetic underflow has occurred;
  (v) an arithmetic overflow has occurred;
  (vi) a division by zero has occurred;
  (vii) an instruction has accessed an invalid operand.

For example, the conditions (i) to (vii) may relate to floating point arithmetic operations.

Another example embodiment provides a data processing method comprising:
  executing program instructions in an instruction execution order;
  storing information on a set of instructions for which execution has been initiated, including providing ordering information indicating the relative position of each instruction in the set of instructions with respect to a program code order;
  committing the results of executed instructions;
  setting one or more cumulative status registers in response to a respective condition generated by execution of an instruction, a cumulative status register which has been set then remaining set until an unset instruction is executed; and
  storing for at least those of the one or more cumulative status registers which are not currently set, an identifier of an instruction which is earliest in the program code order in the set of instructions and which generated a condition to set that cumulative status register.

Another example embodiment provides data processing circuitry comprising:
  means for executing program instructions in an instruction execution order;
  means for storing information on a set of instructions for which execution has been initiated, including providing ordering information indicating the relative position of each instruction in the set of instructions with respect to a program code order;
  means for committing the results of executed instructions;
  means for setting one or more cumulative status registers in response to a respective condition generated by execution of an instruction, a cumulative status register which has been set then remaining set until an unset instruction is executed; and
  means for storing for at least those of the one or more cumulative status registers which are not currently set, an identifier of an instruction which is earliest in the program code order in the set of instructions and which generated a condition to set that cumulative status register.

Figure 1:
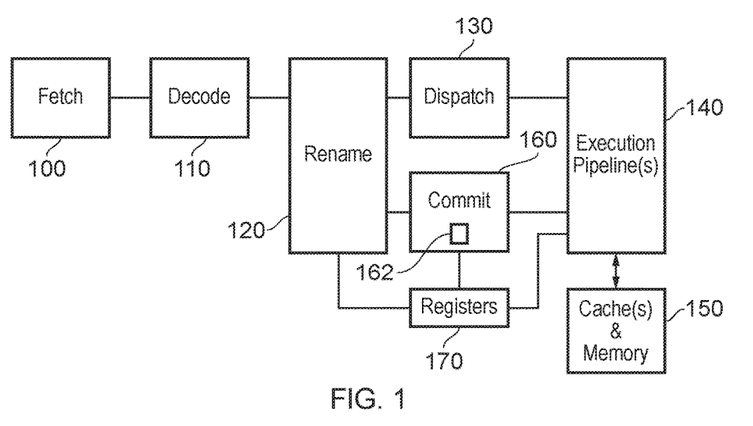
FIG. 1 schematically illustrates data processing circuitry.

Referring now to the drawings, FIG. 1 schematically illustrates a so-called out-of-order processor or data processing circuitry.

Out-of-order processing involves decoding and executing instructions according to the availability of the input data rather than necessarily the order in which the instruction order of program code for execution. This can provide a degree of performance improvement because each instruction has to wait primarily for its own input to be ready rather than for the preceding instruction in the program code order to be executed. Note that the term "out-of-order" does not require that instructions are executed in an order which is different to the program code order, but indicates that the instructions can be executed in a different order of this nature.

The example shown in FIG. 1 comprises instruction fetch circuitry 100 which fetches instructions in readiness for execution. Fetched instructions may be held in one or more queues (not shown) before being decoded by decode circuitry 110. The decode circuitry 110 has access to renaming circuitry 120 which maintains a list of the current or prevailing correspondence between so-called architectural registers and physical registers.

Architectural registers are those program registers specified by the instruction set architecture. Physical registers are those program registers provided by the physical execution hardware of the processor. In an out-of-order processor there may typically be a larger number of physical registers than the number of available architectural registers. When an instruction is decoded and prepared for execution, any architectural registers referenced by that instruction are mapped to available ones of the physical registers and the mapping, in terms of sets of so-called tag data, is maintained by the renaming circuitry 120. The renaming circuitry 120 can issue a stall indication in instances where the renaming circuitry 120 has run out of available physical registers for a mapping (as required by the decoding of an instruction) to be implemented.

Decoded instructions are passed to dispatch circuitry 130 for dispatching to one or more execution pipelines 140 which can optionally access a cache or main memory 150. Commit circuitry 160 provides a commit queue 162 to provide a buffer for instructions for which the results of execution have not yet been "committed", or output into the program flow after execution.

Instructions are dispatched and decoded in program flow order, but may be executed in another (instruction execution) order, so the renaming circuitry 120 and the commit circuitry 160 cooperate to allow coordination of this process and the cross-referencing of output operands (as mapped from architectural to physical registers) of instructions earlier in the program flow to input operands of instructions later in the program flow.

FIG. 1 also shows a set of registers 170, specifically a floating point status register (FPSR) which stores, potentially amongst other items, so-called cumulative status registers relating to floating point operations.

Here, the term "cumulative" indicates that once a register has been "set", it remains "set" until an explicit operation takes place to "unset" it. Therefore, if one of the registers is in a set condition, this indicates that the respective condition has occurred at some point since the last time the register was unset. In examples, a "set" register can be represented by a value 1 at the relevant bit position in the FPSR, and an "unset" register can be represented by the value 0 at the relevant bit position. However, other representations and/or pluralities can be used.

Seven example cumulative status register bits will be discussed below. These will be referred to as initials and are as follows.

QC: this is a cumulative saturation indicator, where saturation occurs if a result value in a floating point calculation exceeds the maximum value which can be represented by the data format in use
IDC: this is a so-called input denormal condition
IXC: this represents an inexact condition
UFC: this represents a data underflow
OFC: this represents a data overflow
DZC: this represents a divide by zero condition
IOC: this represents an attempt to execute an invalid operation.

As mentioned, these can relate to floating point arithmetic operations, but other types of cumulative registers can be used, for example relating to other instruction execution conditions. Each of these can be set by the relevant condition occurring at execution of one of the instructions. In the context of an out-of-order processor, for instructions which have not yet been committed (so-called "in-flight" instructions), if such a condition occurs it would be inappropriate to set the value of the physical cumulative status register bit until the relevant instruction which caused the condition is committed. Care also needs to be taken in the case where instructions are executed speculatively, for example in response to a prediction of which way a branch instruction will change the program flow, and which then need to be flushed from the commit queue if the prediction of the branch execution turns out to have been wrong. Again, it would be incorrect to have updated the cumulative status register bit in the case of an instruction which is later flushed rather than being committed.

So, in previous out-of-order processors, a record is maintained of each in-flight instruction and any conditions which have occurred to set one or more of the cumulative status register bits. Then, at commit, any necessary changes can be made to the cumulative status register bits on the basis of the stored information. The following is an example of this previous approach:

ROBid 00: QC IDC IXC UFC OFC DZC IOC
ROBid 01: QC IDC IXC UFC OFC DZC IOC
ROBid 02: QC IDC IXC UFC OFC DZC IOC
ROBid 03: QC IDC IXC UFC OFC DZC IOC
. . .
. . .
. . .
ROBid n-1: QC IDC IXC UFC OFC DZC IOC where "ROBid nn" indicates an identifier of each in-flight instruction in the commit queue or reorder buffer, and the entries "QC IDC IXC UFC OFC DZC IOC" provide a respective data field (for example, one bit each) indicating whether the outcome of processing that instruction has had any effect on the respective cumulative status bit. As an instruction is committed and its buffer entries removed, these data fields are used to modify (if necessary) each physical cumulative status bit.

So, the amount of data which must be stored to achieve this previously proposed approach scales with the number of in-flight instructions and the number of cumulative status bits.

Figure 2:
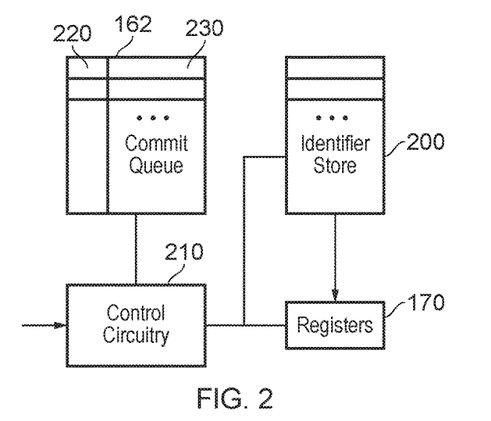
FIG. 2 schematically illustrates commit circuitry.

FIG. 2 schematically illustrates parts of the commit circuitry 160 according to examples of the present technique, including the commit queue 162, an identifier store 200 and control circuitry 210. These items can cooperate to provide information to allow the setting of the cumulative status register bits in the registers 170.

In overall summary, the present technique involves retaining, in the identifier store 200, information to identify the oldest currently in-flight instruction which resulted in a condition which would change one or more of the cumulative status register bits from an "unset" to a "set" condition. An example of the format of data stored in the identifier store 200, for the seven example cumulative status register bits discussed above, is as follows:

QC: ROBid_oldest_1writer
IDC: ROBid_oldest_1writer
IXC: ROBid_oldest_1writer
UFC: ROBid_oldest_1writer
OFC: ROBid_oldest_1writer
DZC: ROBid_oldest_1writer
IOC: ROBid_oldest_1writer The precise format of the data stored in the identifier store is not relevant to the underlying technique, and indeed it could be that the identity of each of the cumulative status register bits QC . . . IOC is implied by the location in the identifier store rather than being stored explicitly.

As mentioned above, the previously proposed format referred to above requires total storage of (n*CSB), where n is the number of in-flight instructions held in the commit queue and CSB is the number of individual cumulative status register bits. In contrast, the storage requirements for the identifier store are $((\log_2 n)*CSB)$, where $\log_2 n$ represents the number of bits required to encode an ID for any one of the currently in-flight instructions. Therefore, in at least some examples, a potential saving in storage for this functionality can be achieved.

An identifier of the oldest (in the program flow order) of the currently in-flight instructions which gave rise to a condition which would set one or more of the cumulative status register bits is stored for that cumulative status register bit in the identifier store 200. If, subsequently, an instruction executed later in the instruction execution order but having an earlier position in the program flow order also causes a setting of that cumulative status register bit, the entry in the identifier store is replaced by the identifier of the newly executed but earlier in the program flow order instruction. When an instruction is removed from the commit queue by being committed or retired, the relevant change can be implemented to the respective cumulative status register bit. If an instruction is removed from the commit queue by being flushed, its entry in the identifier store is deleted.

Referring to the other features of FIG. 2, the commit queue has an identifier 220 associated with each currently in-flight instruction and potentially other information 230 associated with that instruction. The control circuitry 210 oversees the storage of information in the identifier store 200 and the removal of that information, if necessary updating one or more of the cumulative status register bits. In this way, the data store (commit queue) is configured to access the information about the set of instructions according to the respective identifiers of those instructions.

FIGS. 1 and 2 therefore provide an example of data processing circuitry comprising:

out-of-order instruction execution circuitry 140 to execute program instructions in an instruction execution order;

a data store 162, to store information on a set of instructions for which execution has been initiated (but, in at least some examples, for which the results of executing those instructions have not yet been committed), the data store providing ordering information indicating the relative position of each instruction in the set of instructions with respect to a program code order;

commit circuitry 160 to commit the results of instructions executed by the instruction execution circuitry;

one or more cumulative status registers 170 configured to be set in response to a respective condition generated by execution of an instruction and then to remain set until an unset instruction is executed; and an identifier store 200, to store for at least those of the one or more cumulative status registers which are not currently set, an identifier of an instruction which is earliest in the program code order in the set of instructions and which generated a condition to set that cumulative status register.

Figure 3:
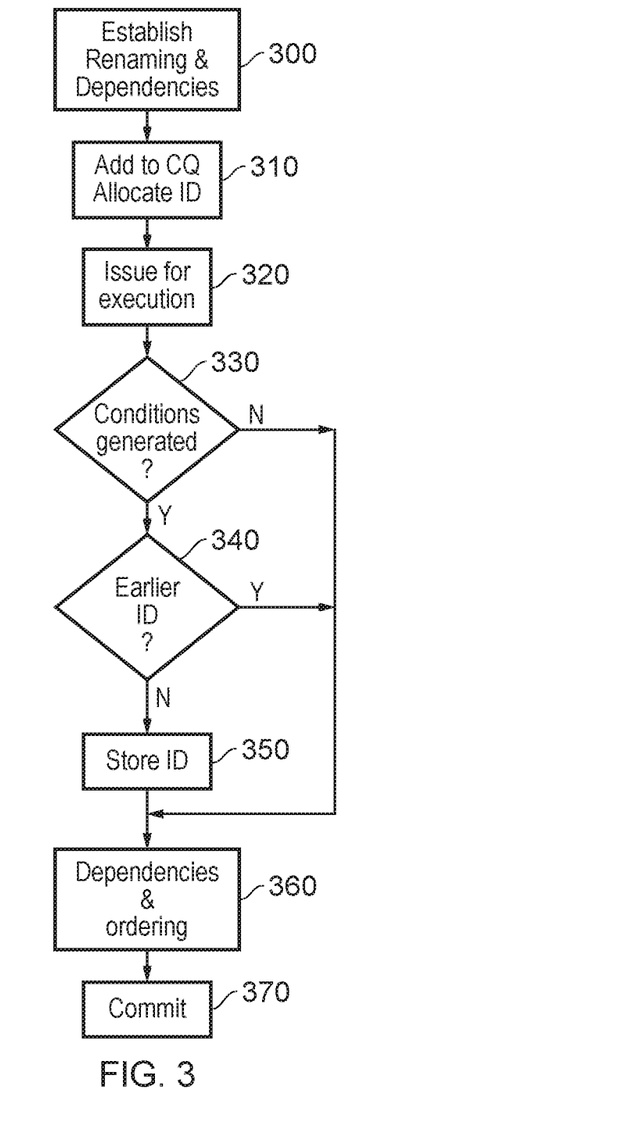
FIGS. 3 to 6 are schematic flowcharts illustrating respective methods.

FIG. 3 is schematic flow chart illustrating aspects of the operation of the circuitry of FIGS. 1 and 2, particularly relating to the storage of information in the identifier store 200.

In respect of a newly decoded instruction, at a step 300 the renaming circuitry 120 establishes any register renaming and inter-instruction dependencies required for the new instruction.

At a step 310, when there is space in the commit queue 160, the instruction is allocated an identifier and added to the commit queue. The identifiers can be allocated on a rotating basis such that an identifier which has been released by virtue of a previous instruction being committed can be allocated (subject to potential precautions discussed below) to the new instruction.

At a step 320, the instruction is issued for execution by the dispatch circuitry and is executed by the execution pipeline(s) 140.

In response to execution of the instruction, a test is carried out at a step 330 as to whether any conditions have been generated by execution of the instruction which would lead to the setting of one or more cumulative status register bits. If the answer is no then control passes to a step 360 to be discussed below. If the answer is yes then control passes to a step 340 at which the control circuitry 210 detects whether, for that cumulative status register bit, an identifier which is earlier in the program code order already appears in the identifier store 200. If the answer is yes then that earlier identifier remains in place and control passes to the step 360. If the answer is no, either because no other identifier is currently in the store or because an identifier corresponding to an instruction which is later, in the program code order, than the current instruction is present, then control passes to a step 350 at which the control circuitry 210 stores the identifier of the current instruction in the identifier store, at the entry in the identifier store 200 relating to the relevant cumulative status register bit.

At the step 340, therefore, the control circuitry 210 is configured to detect, in response to execution of an instruction generating a condition to set a cumulative status register, whether the identifier of another instruction earlier in the program code order is present in the identifier store for that cumulative status register.

The step 340 can also detect whether the relevant cumulative status register bit is already set and, if so, treat this outcome as a "yes" response to divert control to the step 360, on the grounds that if the relevant bit is already set, the cumulative nature of the arrangement means that the current instruction will have no effect on the status of that bit. However, in other examples, this further test is not applied, and the identifier store is configured to store, for each of the one or more cumulative status registers, the identifier of the instruction, earliest in the program code order in the set of instructions, which generated a condition to set that cumulative status register.

At the step 350, the control circuitry determines that no other instruction earlier in the program code order is present in the identifier store for that cumulative status register, the control circuitry is configured to store the identifier of the current instruction in the identifier store.

Then, at the step 360, once the inter-instruction dependencies of other previous instructions have been resolved, the instruction can be committed at a step 370.

Figure 4:
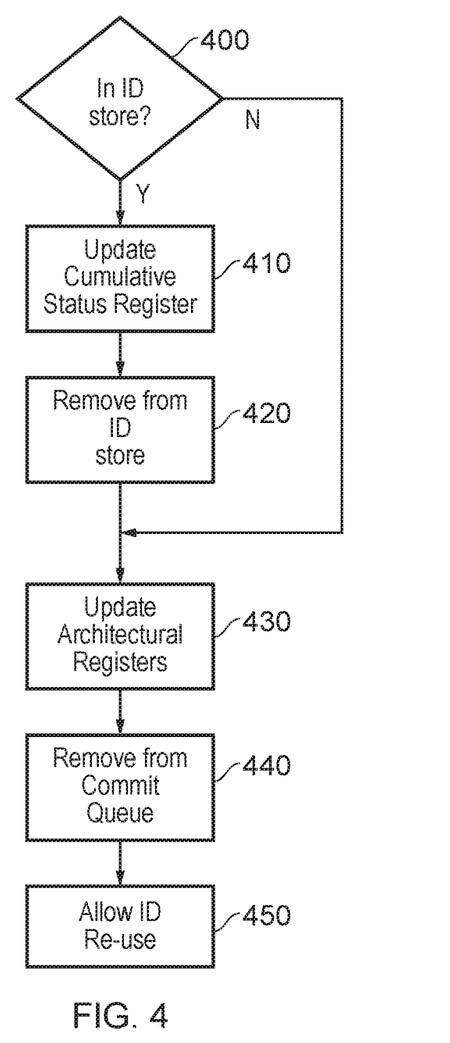

FIG. 4 schematically illustrates aspects of the commit process.

When an instruction is ready to be committed, at a step 400 the control circuitry 210 detects whether the identifier for that instruction is held in any of the entries in the identifier store 200. If the answer is no then control passes to a step 430 to be discussed below. If the answer is yes then control passes to a step 410 at which the relevant cumulative status register bit is set, if it is not already set. The control circuitry 210 can operate to set a currently unset cumulative status register in response to an instruction identified in the identifier store being committed. According to the definition of the cumulative status register bits discussed above, if a cumulative status register bit is indeed already set then no action is taken the step 410. At a step 420, the relevant identifier is removed from the identifier store, for example by the control circuitry 210 being configured to remove an identifier from an entry in the identifier store associated with a cumulative status register, in response to the control circuitry setting that cumulative status register.

Then, at a step 430 the other registers relating to the results of the processing of the instruction are updated. This process makes use of the renaming carried out by the renaming circuitry 120 and discussed above.

The instruction is then removed from the commit queue at a step 440.

At a step 450, the identifier is allowed to be reused. This reuse can optionally be subject to constraints, for example because a remaining part of the execution of an instruction may still be in progress at the time that the step 450 is reached. For example, the control circuitry may be configured to inhibit the re-use of an identifier until after the setting of the cumulative status register.

Figure 5:
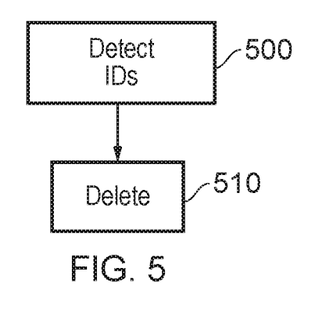

FIG. 5 schematically illustrates aspects of a flush process in which in-flight instructions are deleted because they were being speculatively executed and the speculation turned out to be incorrect.

In response to the identifier, in the program flow order, of the first instruction to be flushed (for example, the first instruction of an incorrectly speculated branch), at a step 500 the control circuitry 210 detects whether the identifiers of that instruction or any following instructions (in the program flow order) are held in the identifier store. If so, then they are deleted at the step 510.

The flushing of instructions occurs forwards from a particular position in the program flow order, and so if any of the flushed instructions was held in the identifier store, this indicated that there were no older or earlier instructions which had led to the setting of any of the cumulative status register bits and which were still in-flight. So, this means that it is a valid operation to delete any of the identifiers of flushed instructions at a step 510.

Therefore, at the step 510 the control circuitry 210 is configured to remove an identifier from an entry in the identifier store associated with a cumulative status register, in response to the flushing of the corresponding instruction.

Figure 6:
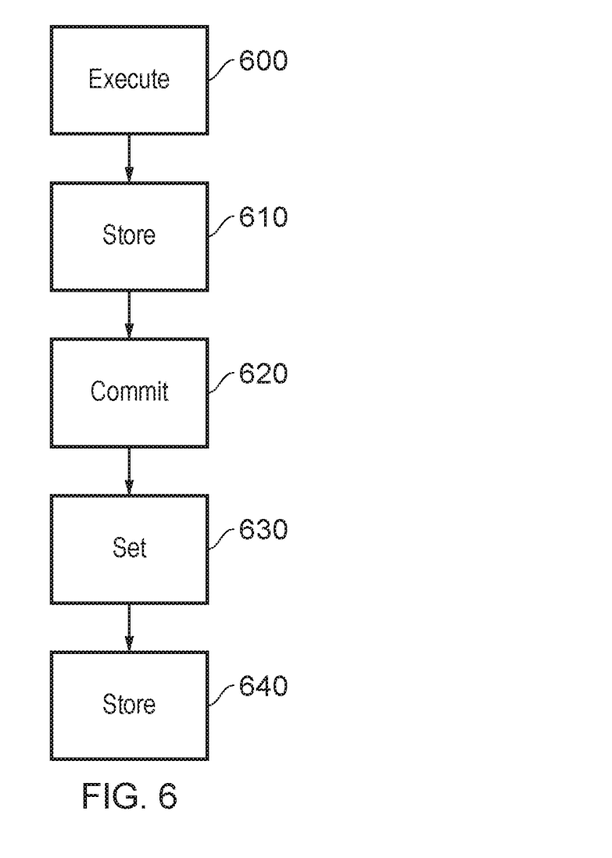

FIG. 6 is a schematic flowchart illustrating a data processing method comprising:

executing (at a step 600) program instructions in an instruction execution order;

storing (at a step 610) information on a set of instructions for which execution has been initiated (but for which, in at least some examples, the results of executing those instructions have not yet been committed), including providing ordering information indicating the relative position of each instruction in the set of instructions with respect to a program code order;

committing (at a step 620) the results of executed instructions;

setting (at a step 630) one or more cumulative status registers in response to a respective condition generated by execution of an instruction, a cumulative status register which has been set then remaining set until an unset instruction is executed; and storing (at a step 640) for at least those of the one or more cumulative status registers which are not currently set, an identifier of an instruction which is earliest in the program code order in the set of instructions and which generated a condition to set that cumulative status register.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data processing circuitry comprising:
out-of-order instruction execution circuitry to execute program instructions in an instruction execution order;
a data store, to store information on a set of instructions for which execution has been initiated, the data store providing ordering information indicating the relative position of each instruction in the set of instructions with respect to a program code order;
commit circuitry to commit the results of instructions executed by the instruction execution circuitry;
one or more cumulative status registers configured to be set in response to a respective condition generated by execution of an instruction and then to remain set until an unset instruction is executed; and
an identifier store, to store for at least those of the one or more cumulative status registers which are not currently set, an identifier of an instruction which is earliest in the program code order in the set of instructions and which generated a condition to set that cumulative status register; and
control circuitry to set a currently unset cumulative status register in response to an instruction identified in the identifier store being committed,
wherein the data store is configured to access the information about the set of instructions according to the respective identifiers of those instructions, and
wherein the control circuitry is configured to inhibit the re-use of an identifier until after the setting of the cumulative status register.

2. Circuitry according to claim 1, in which the identifier store is configured to store, for each of the one or more cumulative status registers, the identifier of the instruction, earliest in the program code order in the set of instructions, which generated a condition to set that cumulative status register.

3. Circuitry according to claim 2, in which the control circuitry is configured to detect, in response to execution of an instruction generating a condition to set a cumulative status register, whether the identifier of another instruction earlier in the program code order is present in the identifier store for that cumulative status register.

4. Circuitry according to claim 3, in which, when the control circuitry determines that no other instruction earlier in the program code order is present in the identifier store for that cumulative status register, the control circuitry is configured to store the identifier of the current instruction in the identifier store.

5. Circuitry according to claim 1, in which the control circuitry is configured to remove an identifier from an entry in the identifier store associated with a cumulative status register, in response to the control circuitry setting that cumulative status register.

6. Circuitry according to claim 1, in which the control circuitry is configured to remove an identifier from an entry in the identifier store associated with a cumulative status register, in response to the flushing of the corresponding instruction.

7. Circuitry according to claim 1, in which the cumulative status registers are arithmetic status registers which respectively indicate one or more conditions selected from the list consisting of:
(i) an arithmetic saturation has occurred;
(ii) an input denormal exception has occurred;
(iii) an inexact exception has occurred;

(iv) an arithmetic underflow has occurred;
(v) an arithmetic overflow has occurred;
(vi) a division by zero has occurred;
(vii) an instruction has accessed an invalid operand.

8. Circuitry according to claim 7, in which the conditions (i) to (vii) relate to floating point arithmetic operations.

9. A data processing method comprising:
executing program instructions in an instruction execution order;
storing information on a set of instructions for which execution has been initiated, including providing ordering information indicating the relative position of each instruction in the set of instructions with respect to a program code order;
committing the results of executed instructions;
setting one or more cumulative status registers in response to a respective condition generated by execution of an instruction, a cumulative status register which has been set then remaining set until an unset instruction is executed; and
storing for at least those of the one or more cumulative status registers which are not currently set, an identifier of an instruction which is earliest in the program code order in the set of instructions and which generated a condition to set that cumulative status register;
setting a currently unset cumulative status register in response to an instruction identified in the identifier store being committed;
wherein the step of storing information comprises accessing the information about the set of instructions according to the respective identifiers of those instructions; and
inhibiting the re-use of an identifier until after the setting of the cumulative status register.

10. Data processing circuitry comprising:
means for executing program instructions in an instruction execution order;
means for storing information on a set of instructions for which execution has been initiated, including providing ordering information indicating the relative position of each instruction in the set of instructions with respect to a program code order;
means for committing the results of executed instructions;
means for setting one or more cumulative status registers in response to a respective condition generated by execution of an instruction, a cumulative status register which has been set then remaining set until an unset instruction is executed; and
means for storing for at least those of the one or more cumulative status registers which are not currently set, an identifier of an instruction which is earliest in the program code order in the set of instructions and which generated a condition to set that cumulative status register;
means for setting a currently unset cumulative status register in response to an instruction identified in the identifier store being committed;
wherein the means for storing information is operable to access the information about the set of instructions according to the respective identifiers of those instructions; and
means for inhibiting the re-use of an identifier until after the setting of the cumulative status register.

* * * * *